United States Patent [19]
von Wichert et al.

[11] Patent Number: 4,502,908
[45] Date of Patent: Mar. 5, 1985

[54] APPARATUS FOR INTERMITTENTLY ACTUATING HEATING TOOLS IN PACKING MACHINES

[75] Inventors: Nils von Wichert, Glinde; Dieter Schwenke, Hamburg, both of Fed. Rep. of Germany

[73] Assignee: Hauni-Werke Körber & Co. KG, Hamburg, Fed. Rep. of Germany

[21] Appl. No.: 541,293

[22] Filed: Oct. 12, 1983

[30] Foreign Application Priority Data

Oct. 15, 1982 [DE] Fed. Rep. of Germany ....... 3238234

[51] Int. Cl.³ .............................................. B21J 9/10
[52] U.S. Cl. .................. 156/350; 74/568 R; 53/75; 156/580
[58] Field of Search ............... 156/218, 203, 466, 443, 156/350, 580, 583.1, 583.4; 74/568 T, 568 R; 53/373, 375, 75

[56] References Cited
U.S. PATENT DOCUMENTS

4,344,312 8/1982 Flamme ........................ 74/568 R X

*Primary Examiner*—David Simmons
*Attorney, Agent, or Firm*—Peter K. Kontler

[57] ABSTRACT

A heated sealing tool is actuated intermittently for fixed intervals of time to engage thermoplastic envelopes of successive cigarette packs which are supported by an indexible turret. In order to ensure that the intervals of engagement between the tool and successive envelopes are not altered when the speed of the prime mover of the packing machine is changed, the tool is mounted on one arm of a two-armed lever the other arm of which carries roller followers for two discrete coaxial cams which jointly actuate the tool through the medium of the lever. Each of the cams is driven at a speed which is proportional to the speed of the prime mover; however, one of the cams is angularly adjustable relative to the other cam by a gear motor or a bevel gear transmission in response to signals which denote changes in the speed of the prime mover so that the duration of intervals of engagement remains unchanged. If the cams have lobes which serve to hold the tool out of engagement with the envelopes, that portion of each revolution of the cams during which the lobes engage the respective followers is shortened if the speed of the prime mover is increased and vice versa. The cams can be driven in the same direction or in opposite directions.

20 Claims, 4 Drawing Figures

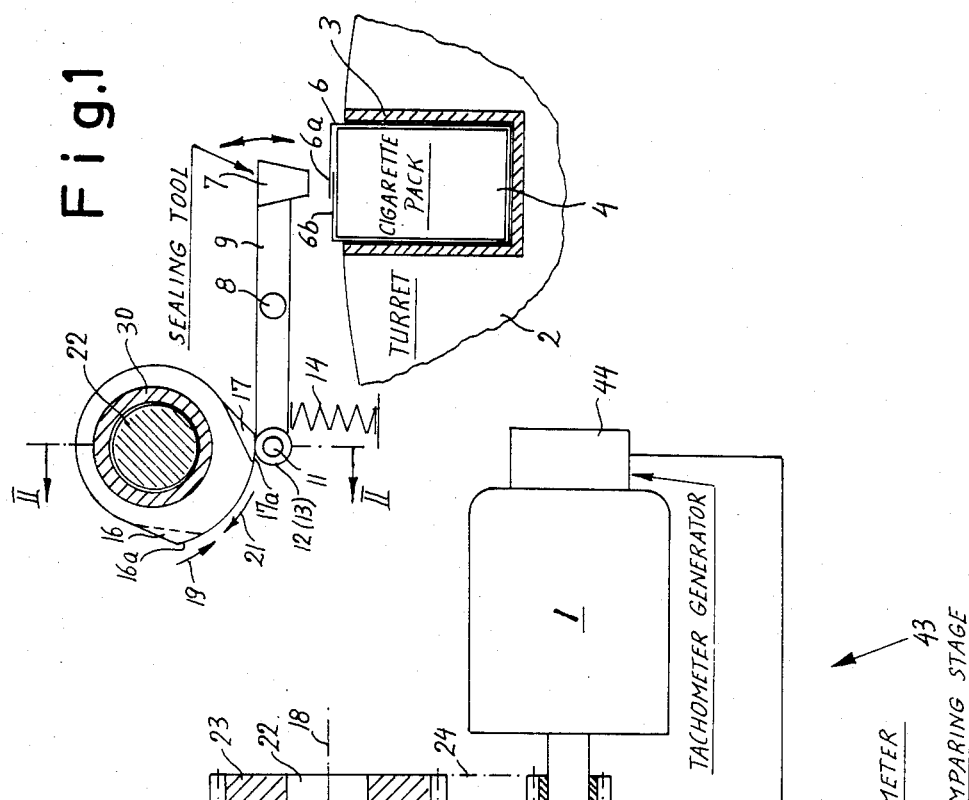
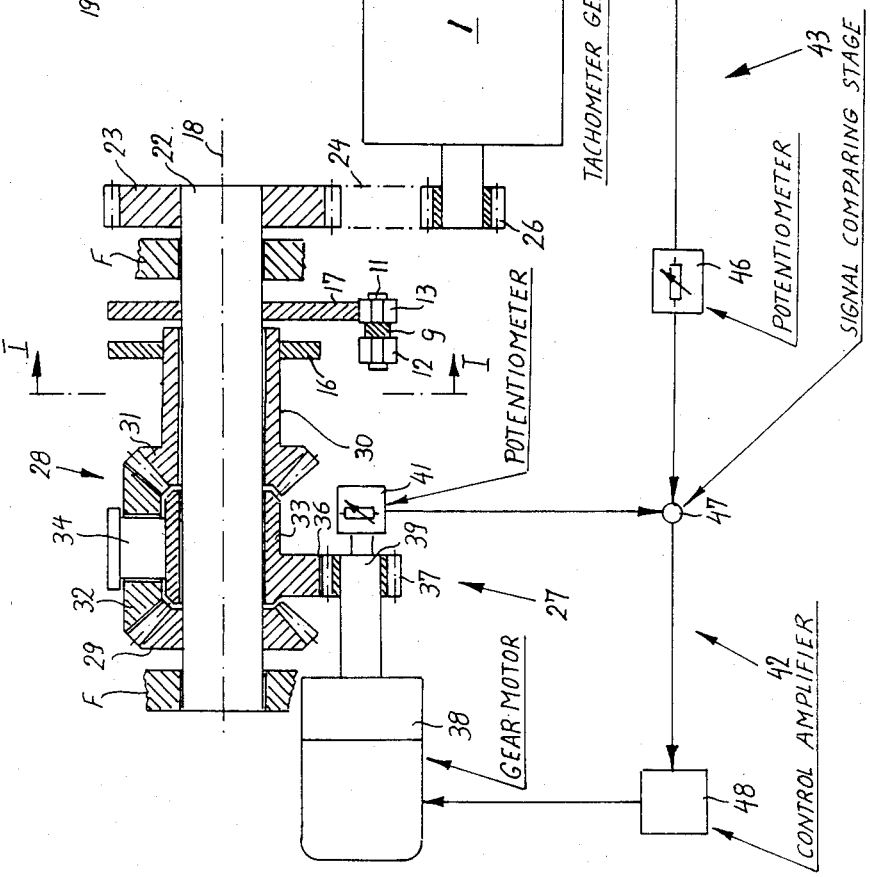

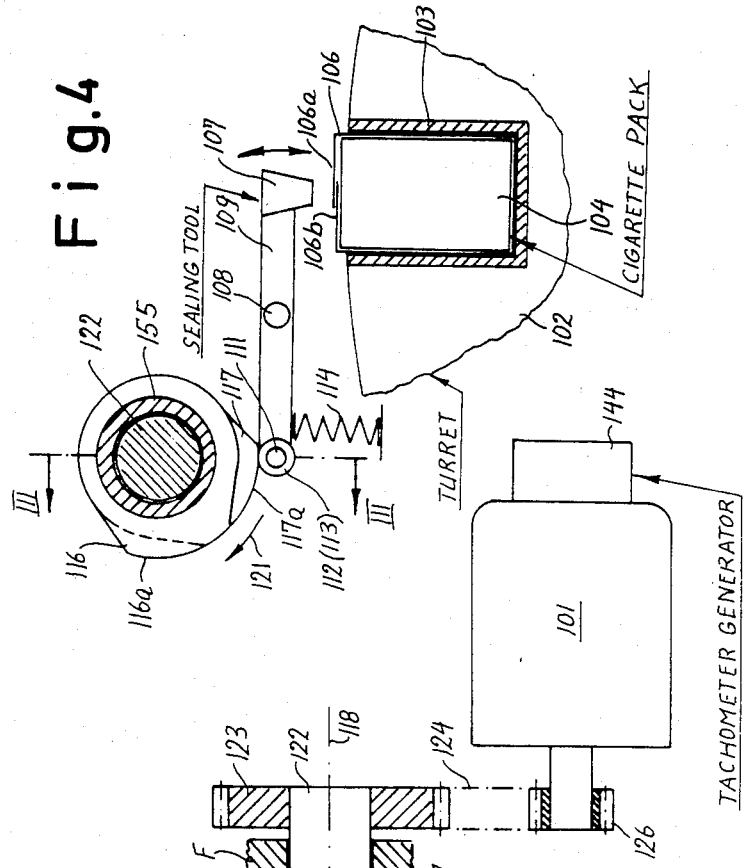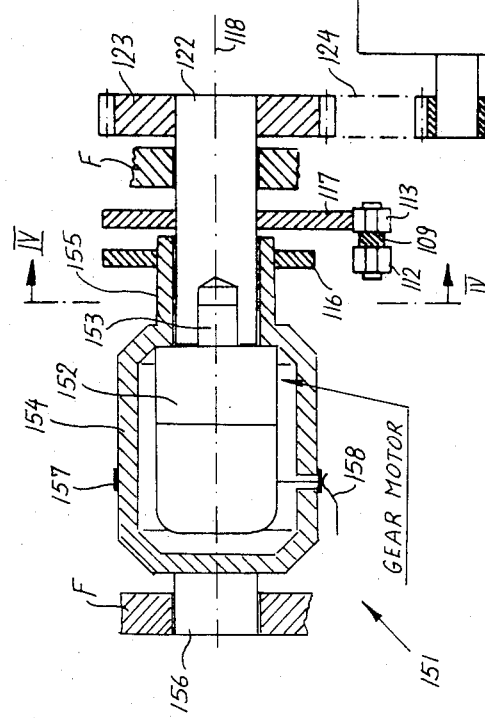

APPARATUS FOR INTERMITTENTLY ACTUATING HEATING TOOLS IN PACKING MACHINES

BACKGROUND OF THE INVENTION

The present invention relates to improvements in apparatus for intermittently operating pivotable or otherwise movable driven members by a rotary cams. More particularly, the invention relates to improvements in apparatus which can be utilized in packing machines, such as cigarette packing machines, for intermittently actuating heated sealing tools which weld sheets or parts of sheets of heat-sealable (particularly synthetic thermoplastic) material to each other.

In many types of cigarette packing machines, successive packs which contain arrays of cigarettes are delivered into the range of one or more heated sealing tools which are actuated to engage the wrappers of successive packs and to thereby bond flaps, tucks or otherwise configurated parts of wrappers to one another. For example, a heated sealing jaw can be pivoted into sealing engagement with portions of polypropylene wrappers for successive cigarette packs which are transported by an indexible turret. The movements of the sealing jaw into engagement with successive wrappers are synchronized with indexing movements of the turret to thus ensure that the jaw engages a fresh wrapper whenever the turret is brought to a standstill. Such machines are further provided with apparatus which ensure that the sealing jaw is held in heat-transmitting engagement with successive wrappers for identical intervals of time irrespective of the (variable) speed of the machine, i.e., independently of the frequency at which the turret is indexed with reference to the jaw. Since the means for pivoting the sealing jaw into and from engagement with successive wrappers receives motion from the prime mover which indexes the turret, such pivoting means must be adjusted whenever the speed of the prime mover is changed.

An apparatus which can ensure that the periods of dwell of the sealing tool in heat-transmitting engagement with successive wrappers will remain unaffected by the speed of the prime mover for (a) the means which moves the tool and (b) the turret or another suitable conveyor for the wrappers is disclosed in German Offenlegungsschrift No. 19 65 693. A rotary disc cam is tracked by a roller follower on a first lever which transmits motion to a two-armed second lever through the medium of a link. One arm of the second lever is adjustably connected to the respective end portion of the link, and the other arm of the second lever carries the heating tool. The apparatus of this German publication further comprises a device which can shift the one arm of the second lever lengthwise of the link against the opposition of a coil spring to thereby change the inclination of the second lever relative to the first lever in dependency on changes in the speed of the cam. Such shifting of the one arm of the second lever entails a movement of the sealing tool away from its operative position if the second lever is thereby pivoted from an operative position in which the sealing or heating tool is ready to engage a workpiece. A timer which is operated in synchronism with the moving parts of the machine is used to actuate a valve which is installed in a conduit serving to admit fluid to a cylinder whose piston rod constitutes a means for shifting the one arm of the second lever against the opposition of the coil spring so that the period of heat-transmitting engagement between the heating tool and a workpiece is determined by the timer, i.e., by the momentary machine speed which is proportional to the RPM of the disc cam. The machine which embodies the just described apparatus is designed to produce plastic bags and similar receptacles.

The preamble of the aforementioned German publication further refers to heating or sealing tools which are actuated exclusively by pneumatic means.

German Offenlegungsschrift No. 15 11 626 discloses heating or sealing tools which are actuated by timer-controlled pneumatic means or by electomagnets.

The just discussed conventional apparatus are not suitable for use in many recent types of packing machines, such as modern cigarette packing machines which are designed to turn out up to 500 packs per minute. This is due to the fact that a timer-controlled pneumatic actuator or an electromagnetic actuator is either too slow or too weak to reliably actuate the sealing tool or tools at 500 cycles per minute. Moreover, the useful life of such conventional apparatus is relatively short which renders them impractical for use in a modern high-speed cigarette packing machine because even a short-lasting interruption of operation of such a machine for the purpose of inspecting, repairing or replacing the actuating apparatus for one or more sealing tools would entail inordinately large losses in output. This will be readily appreciated by bearing in mind that an average cigarette pack contains twenty cigarettes.

OBJECTS AND SUMMARY OF THE INVENTION

An object of the invention is to provide a novel and improved apparatus which ensures that the action of a heated sealing tool upon successive workpieces is not adversely influenced by fluctuations in the speed of the prime mover for the apparatus, even if the tool must be actuated at a frequency of up to and in excess of five-hundred per minute.

Another object of the invention is to provide a novel and improved apparatus which can actuate a pivotable or otherwise movable driven member at a high or low frequency and in such a way that the period of dwell of the driven member in its operative position is not affected by minor or pronounced fluctuations of the speed of the prime mover for such apparatus.

An additional object of the invention is to provide a relatively simple, reliable, compact and inexpensive apparatus whose useful life is longer than that of heretofore known apparatus even if it is called upon to actuate the driven member at a high or very high frequency for long periods of time.

A further object of the invention is to provide a novel and improved method of ensuring that a heated sealing tool can be maintained in heat-transmitting engagement with each of a short or a long series of workpieces for identical intervals of time even if the frequency at which the tool is actuated must be varied within a wide range.

Still another object of the invention is to provide an apparatus which can be installed in existing cigarette packing or other machines as a superior substitute for heretofore known apparatus for ensuring proper actuation of intermittently operated sealing tools for envelopes or wrappers consisting of polypropylene or other heat-sealable material.

An additional object of the invention is to provide a novel and improved system of cams for use in the above outlined apparatus.

Another object of the invention is to provide novel and improved adjusting means for the cams.

An ancillary object of the invention is to provide novel and improved operative connections between the cams and the prime mover of a cigarette packing machine or the like.

The invention is embodied in an apparatus for intermittently actuating a driven member, particularly a heating or sealing tool in a machine (such as a cigarette packing machine) wherein the tool is moved into and from heat-transmitting engagement with components or portions of heat-sealable wrapping material. The apparatus comprises a pair of rotary cams which are arranged to jointly actuate the driven member during a portion of each revolution of the cams whereby the interval of actuation is to remain unchanged, drive means for rotating the cams at a variable speed, and regulating means for maintaining the intervals of actuation of the driven member at a constant value during each revolution of the cams regardless of changes in rotational speed of the cams. Such regulating means comprises means for changing the orientation of at least one of the cams with reference to the other cam as a function of variations of rotational speed of the cams. The cams are preferably rotatable about a common axis and the orientation changing means then comprises means for changing the angular position of at least one of the cams with reference to the other cam.

In accordance with one presently preferred embodiment of the invention, the orientation changing means comprises a transmission which receives torque from the drive means and serves to rotate the one cam. Such transmission can comprise a first gear which drives the one cam and a second gear which mates with the first gear and is movable about the axis of the first gear. The orientation changing means further comprises means for moving the second gear about the axis of the first gear. The arrangement is preferably such that the drive means comprises means (e.g., a belt drive) for rotating the other cam in a first direction, and the first gear or the part which rotates the first gear constitutes a means for rotating the one cam in a second direction counter to the first direction. Thus, if the two cams are mounted for rotation about a common axis, one of the cams is driven to rotate in a clockwise direction and the other cam is driven to rotate in a counterclockwise direction.

In such apparatus, the transmission preferably comprises a first bevel gear which is rotatable about the common axis of the cams, which is driven by the other cam (e.g., by being mounted directly on the shaft of the other cam) and which receives torque from the drive means, a second bevel gear (corresponding to the aforementioned first gear) which serves to rotate the one cam and is coaxial with the first bevel gear, and a third bevel gear (corresponding to the aforementioned second gear) which mates with the first and second bevel gears and is turnable about the common axis of the first and second bevel gears. The orientation changing means then further comprises means for turning the third bevel gear about the common axis of the first and second bevel gears to thereby change the orientation of the one cam relative to the other cam through the medium of the second bevel gear. To this end, the hub of the third bevel gear is turnable about the common axis of the first and second bevel gears and the turning means can comprise a servomotor which drives a pinion in mesh with a gear or gear segment on the hub of the third bevel gear. The axis of rotation of the third bevel gear is preferably normal to the common axis of the first and second bevel gears.

In accordance with a second presently preferred embodiment of the invention, the drive means includes means for rotating the two cams at the same rotational speed and in the same direction. The orientation changing means then preferably comprises an adjusting device which is interposed between the drive means and the one cam and has means for changing the angular position of the one cam relative to the drive means in response to variations in the speed of the drive means, i.e., in response to variations of the speed of the other cam. The means for changing the angular position of the one cam relative to the drive means can comprise a servomotor which establishes a kinematic connection between the drive means and the one cam. In such apparatus, the one cam can receive torque by way of the other cam, i.e., the other cam can drive the servomotor which, in turn, drives the one cam. In other words, the orientation changing means is interposed between the two cams.

The apparatus preferably further comprises follower means which is interposed between the cams and the driven member. Such follower means can comprise a single follower which tracks both cams or a discrete follower for each of the two cams.

The one cam is preferably rotatably mounted on the shaft of the other cam, and such shaft receives torque from the drive means.

The orientation changing means further comprises a tachometer generator or other suitable means for monitoring the speed of the drive means and for generating signals denoting the speed of the drive means, and means (such as the aforementioned transmission or servomotor) for adjusting the one cam relative to the other cam in response to such signals.

The drive means preferably comprises a variable-speed prime mover and means (such as the aforementioned belt drive) for transmitting torque from the prime mover to the other cam.

Each of the cams can constitute a disc cam with a lobe which actuates the driven member. Actuation can involve moving the driven member to or from operative position. The dimensions of the lobes on the two cams (as considered in the circumferential direction of the respective cams) may but need not be identical.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of an indexible turret for the transport of successive cigarette packs into the range of a pivotable sealing tool and a sectional view of an apparatus which embodies one form of the invention and serves to intermittently actuate the heating tool in such a way that the intervals of dwell of the tool in engagement with the packs are not affected by changes in the speed of drive means for the cams of the apparatus, the section being taken in the direction of arrows as seen from the line I—I in FIG. 2;

FIG. 2 is a partly elevational and partly sectional view of the apparatus (with the turret omitted) as seen in the direction of arrows from the line II—II of FIG. 1;

FIG. 3 is a view similar to that of FIG. 2 but showing a modified apparatus, the section being taken in the direction of arrows as seen from the line III—III of FIG. 4; and FIG. 4 is a sectional view of the modified apparatus as seen in the direction of arrows from the line IV—IV of FIG. 3 and further showing a portion of the turret for cigarette packs.

DESCRIPTION OF THE PREFERRED EMBODIMENTS

Referring first to FIGS. 1 and 2, there is shown an apparatus which is installed in a cigarette packing machine having a conveyor 2 in the form of an indexible turret with equidistant pockets 3 (only one shown) for discrete cigarette packs 4, e.g., customary packs of the type containing arrays of twenty cigarettes each. The main prime mover 1 of the cigarette packing machine is a variable-speed motor which drives the indexing mechanism for the turret 2 in a manner not specifically shown in the drawing. Reference may be had to FIG. 8 of commonly owned U.S. Pat. No. 3,956,870. The purpose of the indexible turret 2 is, among others, to advance successive packs 4 into the range of a mobile sealing tool 7 mounted at the free end of one arm of a driven member in the form of a two-armed lever 9 which is fulcrumed at 8. The preferably electric heating means for the sealing tool 7 is not shown in the drawing. When the turret 2 is at a standstill, a coil spring 14 is caused to pivot the lever 9 in a clockwise direction, as viewed in FIG. 1, and to thereby move the lower end face of the sealing tool 7 into heat-transmitting engagement with a part 6a of a heat-sealable envelope 6 constituting the outermost wrapper of the pack 4 in the respective pocket 3. The part 6a is thereby biased against and is welded to a part 6b to close the envelope 6 around the wrapper therebelow. The turret 2 is then indexed again (e.g., by the geneva movement of the aforementioned U.S. Pat. No. 3,956,870) and the next pack 4 is moved into the range of the sealing tool 7. The latter is lifted away from contact with the part 6a of the illustrated envelope 6 after a predetermined interval of contact with such part, namely, an interval which is best suited to ensure the making of a highly satisfactory bond between the parts 6a and 6b. The envelope 6 may consist of polypropylene or any other suitable (preferably transparent or translucent) synthetic thermoplastic material.

The purpose of the improved apparatus is to ensure that the intervals of engagement between the heating tool 7 and successive envelopes 6 are not affected by variations of the speed of the prime mover 1 and resulting variations of the speed of the means for actuating the driven member 9, i.e., for pivoting the lever 9 against the opposition of the coil spring 14. In other words, the intervals of engagement between the sealing tool 7 and successive envelopes 6 should remain the same irrespective of the speed of the prime mover 1.

In accordance with a feature of the invention, the means for actuating the lever 9 comprises two rotary disc-shaped cams 16 and 17 which are rotatable about a common axis 18. The cams 16, 17 are respectively formed with lobes 16a, 17a which determine the length of intervals during which the tool 7 is held in the illustrated inoperative position (away from the nearest envelope 6) during each revolution of the cams 16 and 17. The left-hand arm of the lever 9, as viewed in FIG. 1, carries follower means for tracking the faces of the cams 16 and 17. The follower means can constitute or comprise a single roller follower which is rotatable about the axis of a shaft 11 mounted on the free end of the left-hand arm of the lever 9 and extending in parallelism with the pivot member 8. In the embodiment of FIGS. 1 and 2, the follower means comprises discrete rollers 12, 13 which are biased toward the faces of the respective cams 16, 17 by the coil spring 14.

The drive means for the cams 16, 17 comprises the prime mover 1 and a belt transmission including a toothed pulley 26 on the output shaft of the prime mover 1, a toothed pulley 23 on the shaft 22 of the cam 17, and an endless toothed belt 24 which is trained over the pulleys 23 and 26. The shaft 22 defines the common axis 18 and is rotatably journalled in two frame members F of the packing machine. This shaft is rigid with the respective cam 17 and rotates the latter in the direction which is indicated by the arrow 21. The cam 16 is rotatable relative to the shaft 22 and is driven to rotate in the direction of arrow 19, i.e., counter to the direction of rotation of the cam 17.

The regulating means 27 for maintaining the intervals of actuation of the heated sealing tool 7 at a constant value irrespective of the momentary speed of the prime mover 1 (and hence of the speed of the cams 16 and 17) during each revolution of the cams 16 and 17 includes means 28 (a bevel gear transmission) for changing the orientation (angular position) of the cam 16 relative to the cam 17 in response to variations of rotational speed of the prime mover 1 (i.e., in response to variations of rotational speed of the cams 16 and 17 which rotate at the same speed but in the opposite directions).

The transmission 28 comprises a first bevel gear 29 which is rigidly connected to and thus receives torque from the shaft 22 of the cam 17, a second bevel gear 31 which faces the bevel gear 29 and has a sleeve-like extension 30 surrounding the shaft 22 and carrying the cam 16, and a third bevel gear 32 whose axis of rotation is normal to the common axis 18 of the bevel gears 29, 31 and which is in permanent mesh with the bevel gears 29, 31. An annular hub 33 of the third bevel gear 32 is rotatable about the shaft 22 and has a gear or gear segment 36 in mesh with a pinion 37 on the output shaft 39 of a servomotor 38 such as TypeE 05. Z 2/155 of Bauer, Esslingen-Neckar, Germany. The hub 33 is secured to a stub shaft 34 around which the bevel gear 32 rotates while transmitting torque from the bevel gear 29 to the bevel gear 31, i.e., from the shaft 22 of the cam 17 to the cam 16. The bevel gear 32 ensures that the cams 16 and 17 rotate in the opposite directions. Since the dimensions of the bevel gears 29 and 31 are the same, the speed at which the cam 17 is driven in the direction of arrow 21 matches the speed at which the cam 16 rotates in the direction of arrow 19. The servomotor 38 can constitute a conventional gear motor whose output shaft 39 can change the angular position of the hub 33 via pinion 37 and gear segment 36 to thereby cause the bevel gear 32 to turn about the axis 18 and to change the angular position of the cam 16 relative to the cam 17 for the purpose of ensuring that the intervals of actuation of the sealing tool 7 and lever 9 remain unaffected by changes in the speed of the prime mover 1, shaft 22 and cams 16, 17. The output shaft 39 of the servomotor 38 is connected with an adjustable (rotary) potentiometer 41 which can transmit signals (denoting the angular position of the shaft 39) to one input of a signal comparing stage 47. Another input of the stage 47 receives signals from a tachometer generator 44 which monitors the speed of the prime mover 1 and transmits signals denoting such speed to the second input of the stage 47 by way of an adjustable potentiometer 46. The potentiometer 41 forms part of a circuit 42 which controls the operation of the servomotor 38 and forms part of a regulating circuit 43 which further includes the stage 47, the potentiometer 46 and the tachometer generator 44. The output of the stage 47 transmits signals to a control amplifier 48 for the servomotor 38.

The operation is as follows:

It is assumed that the prime mover 1 drives the moving parts of packing machine (including the means for indexing the turret 2) at a relatively low speed. Therefore, the cam 16 assumes a predetermined orientation with reference to the cam 17. Thus, the lobe 16a of the angularly adjustable cam 16 nearly overlaps the identical lobe 17a of the cam 17 when the lobe 17a is about to leave the roller follower 13 (the cam 17 rotates in the direction which is indicated by the arrow 21). The leader of the lobe 16a (which orbits in the direction indicated by the arrow 19) is about to engage the respective roller follower 12. It will be noted that, when the speed of the prime mover 1 is low, the cams 16, 17 act jointly upon the driven member (lever 9) and the sealing tool 7 in such a way that the lobe 16a begins to engage the respective roller follower 12 before the lobe 17a advances beyond the roller follower 13. Since the followers 12, 13 are mounted on a common shaft 11 which is secured to the lever 9, the latter remains in the illustrated angular position against the opposition of the coil spring 14 until the lobe 16a moves beyond the roller follower 12. Once the lobe 16a has advanced beyond the roller follower 12, the coil spring 14 is free to dissipate energy and to move the sealing tool 7 against the part 6a of the envelope 6 on the pack 4 which is then held within the range of the sealing tool 7 because the turret 2 is at a standstill. The sealing tool 7 presses the part 6a against and welds the part 6a to the part 6b during the interval which elapses between the instant of advancement of the lobe 16a beyond the roller follower 12 and the instant of engagement of the roller follower 13 by the oncoming lobe 17a. At such time, the lobe 17a pivots the lever 9 counterclockwise, as viewed in FIG. 1, and moves the sealing tool 7 away from the finished envelope 6 so that the turret 2 can be indexed again in order to place the next envelope 6 into the range of the sealing tool.

Since the prime mover 1 drives the moving parts of the packing machine at a relatively low speed, the signal which the tachometer generator 44 transmits to the stage 47 is indicative of such low speed. This signal is or can be modified by the adjustable potentiometer 46 in such a way that the length of the interval during which the coil spring 14 is free to expand in order to maintain the sealing tool 7 in heat-transmitting engagement with the adjacent part 6a is best suited to ensure proper welding of the part 6a to the part 6b. In other words, the intensity or another characteristic of the signal at the output of the signal comparing stage 47 is such that the control amplifier 48 maintains the output shaft 39 and the pinion 37 thereon in a position in which the angular position of the hub 33 reflects the desired optimum angular position of the cam 16 with reference to the cam 17 at any given stage of each revolution of the cams 16 and 17. In the illustrated angular positions of the cams 16 and 17, the lobe 16a begins to maintain the lever 9 in the illustrated angular position via follower 12 immediately after the lobe 17a moves beyond the follower 13, i.e., the actions of the lobes 17a, 16a upon the respective followers follow one another with the result that, at the particular (low) speed of the prime mover 1, the interval of contact between the sealing tool 7 and the adjacent part 6a of an envelope 6 is the optimum interval for establishment of a satisfactory welded seam or bond.

If the speed of the prime mover 1 is increased, the tachometer generator 44 transmits a modified signal which is compared with the signal from the potentiometer 41 and is transmitted to the control amplifier 48 of the regulating circuit 42 to effect an appropriate change in the angular position of the shaft 39, pinion 37, gear segment 36 and hub 33. This entails a change in the angular position of the cam 16 relative to the cam 17 because the angular movement of the bevel gear 31 which is attributable to turning of the bevel gear 32 about the axis 18 is superimposed upon the angular movement of the cam 16 which is attributable to the fact that the bevel gear 32 is driven by the bevel gear 29 and drives the bevel gear 31. The cam 16 shares all angular movements of the bevel gear 31, i.e., those movements which are caused by the rotating bevel gear 29 as well as the movements which are caused by the pinion 37 as a result of changed intensity or another characteristic of the signal which is transmitted from the signal comparing stage 47 to the control amplifier 48 when the RPM of the prime mover 1 is increased. The result is that the cam 16 is rotated relative to the cam 17 in or counter to the direction of arrow 19, as viewed in FIG. 1, and the leading edge of its lobe 16a engages the roller follower 12 before the trailing edge of the lobe 17a advances beyond the roller follower 13 during each revolution of the shaft 22. Therefore, the interval during which the lever 9 is held in the illustrated position is shortened and the coil spring 14 is free to maintain the tool 7 in engagement with the adjacent part 6a of an envelope 6 during a greater portion of each revolution of the cams 16, 17. Therefore, the intervals of time during which the sealing tool 7 engages successive envelopes 6 are not shortened in spite of the fact that the RPM of the shaft 22 (and hence of the cams 16, 17) is increased as a result of an increase in the speed of the prime mover 1. Such intervals of time remain unchanged, i.e., that portion of each revolution of the shaft 22 during which the sealing tool 7 is free to engage the adjacent envelope 6 is increased if the speed of the prime mover 1 increases and such portion of each revolution is reduced if the speed of the prime mover 1 decreases.

The purpose of the potentiometer 46 is to select the basic angular positions of the cams 16 and 17 relative to each other, i.e., to select optimum intervals of heat-transmitting engagement between the sealing tool 7 and successive envelopes 6 so as to account for the nature of the wrapping material, the thickness of the parts 6a, 6b, the temperature of the tool 7 and/or the desired strength of the bond between the parts 6a and 6b. Any adjustment of the potentiometer 46 influences the intervals of engagement between the sealing tool 7 and successive envelopes 6 irrespective of the speed of the prime mover 1. The intervals of engagement between the sealing tool 7 and successive envelopes 6 can be altered in another way (in addition to or in lieu of adjustment via potentiometer 46), namely, by replacing the illustrated cam 16 and/or 17 with a cam having a shorter or longer lobe, as considered in the circumferential direction of the respective cam.

In addition to abruptly moving the sealing tool 7 into engagement with the adjacent envelope 6, the coil spring 14 performs the function of continuously urging the roller followers 12, 13 toward the respective cams 16, 17. The followers 12, 13 may but need not necessarily remain in engagement with the respective cams 16, 17 when the sealing tool 7 engages an envelope 6; this depends on the selected position of the fulcrum 8 and on the selected length of the right-hand arm of the lever 9.

The apparatus of FIGS. 1 and 2 exhibits the advantage that the means (transmission 28) for changing the orientation of the cam 16 relative to the cam 17 in response to a change in the characteristics of the signal which is generated by the tachometer generator 44 is very compact, sturdy and highly reliable. The reliability of this apparatus is just as satisfactory if the sealing tool 7 is caused to engage an envelope 6 while the lobes 16a, 17a engage the respective followers 12, 13 or if the tool is caused to engage an envelope while the lobes are remote from the respective roller followers.

Each of the lobes 16a, 17a extends along an arc of approximately 90 degrees, as considered in the circumferential direction of the camshaft 22. Thus, if the orientation of the cam 16 relative to the cam 17 is such that the lobe 16a begins to engage the respective roller follower 12 at the time when the lobe 17a is about to move beyond the roller follower 13, the length of intervals during which the tool 7 engages the adjacent envelope 6 can be very short, e.g., in order to avoid charring of envelopes by a hot or very hot sealint tool. Such short intervals of engagement between the sealing tool and successive envelopes are achievable because the cams 16 and 17 are caused to rotate in opposite directions.

The illustrated transmission 28 is simple and compact because its bevel gears 29, 31 are rotatable about a common axis (18). The gear 29 cannot rotate with reference to the cam 17, and the gear 31 cannot rotate relative to the cam 16.

FIGS. 3 and 4 illustrate a second apparatus wherein all such parts which are identical with or clearly analogous to corresponding parts of the apparatus of FIGS. 1 and 2 are denoted by similar reference characters plus 100. The orientation changing means of this second apparatus comprises an adjusting device 151 which is interposed between the drive means 101, 126, 124, 123 and the cam 116. The adjusting device 151 comprises a servometer 152, e.g., a gear motor whose shaft 153 is non-rotatably mounted in and is coaxial with the shaft 122 of the cam 117. This gear motor comprises a housing 154 having a sleeve 155 which surrounds the shaft 122 and carries the cam 116. A stub 156 of the housing 154 is journalled in the left-hand frame member F of FIG. 3. The sleeve 155 can rotate relative to the shaft 122. The gear motor 152 comprises a self-locking gearing or constitutes a so-called brake motor which can transmit but does not itself generate torque. The direction in which the shaft 122 is driven (see the arrow 121) by the toothed pulley 123 is the same as the direction of rotation of the housing 154 and cam 116, i.e., the latter rotates in the same direction as the cam 117. The periphery of the housing 154 is provided with slip rings 157 which are engaged by sliding wipers 158 serving as a means for connecting the housing with a control circuit of the type shown at 43 in FIG. 2. The gear motor 152 changes the angular position of its housing 154 relative to the shaft 122 when the means 144 for monitoring the speed of the prime mover 101 transmits a signal denoting that the speed of the prime mover 101 has been increased or reduced. The housing 154 is then caused to change its angular position relative to the shaft 122 and cam 117, i.e., the angular position of the cam 116 relative to the cam 117 is changed with the result that the intervals of engagement between the sealing tool 107 and the envelopes 106 are not affected by changes in the speed of the prime mover 101 and cam 117. The manner in which the gear motor 152 can change the angular position of its housing 154 relative to the shaft 122 in response to a signal which is transmitted thereto via wiper means 158 and slip rings 157 is known and need not be described here. The motor 152 can turn the housing 154 in a clockwise or in a counterclockwise direction to thereby change the extent of overlap of the lobes 116a, 117a in the basic or starting positions of the cams 116 and 117.

An advantage of the apparatus which is shown in FIGS. 3 and 4 is its simplicity. Thus, the cams 116 and 117 rotate in the same direction and normally at the same speed (except during the very short intervals of adjustment of orientation of the cam 116 relative to the cam 117). The motor 152 establishes a kinematic connection between the prime mover 101 and the cam 116. Its housing 154 rotates about the axis 118 of the shaft 122 which transmits torque thereto and, in order to be capable of transmitting torque to the cam 116, the motor 152 is provided with the aforementioned self-locking gearing or constitutes a so-called brake motor.

While it is possible to mount the cams 16, 17 or 116, 117 for rotation about discrete axes, the illustrated apparatus are preferred because they are simpler and more compact due to the fact that the axes 18, 118 are respectively common to the cams 16, 17 and 116, 117. The same holds true for the operative connections between the cams 16, 17 or 116, 117 and the respective sealing tools 7 and 107. Thus, the illustrated operative connections (roller followers 12, 13 or 112, 113 and lever 9 or 109) are simple, compact and inexpensive.

It will be noted that, in contrast to heretofore known apparatus wherein the sealing tool is actuated by cam and follower means having a single cam, the apparatus of the present invention employs two discrete cams and means for changing the orientation of one of the cams relative to the other cam in order to account for changes in the RPM of the cams as a result of changes in the speed of the drive means for such cams. The sealing tool 7 or 107 is actuated by the cam 17 or 117 (i.e., by the cam which is directly driven by the prime mover 1 or 101) jointly with the cam 16 or 116.

The feature that the sealing tool 7 or 107 is actuated by the cam 17 or 117 jointly with the cam 16 or 116 is desirable and advantageous because this ensures predictable and reproducible operation of the sealing tool even if the number of machine cycles per unit of time is high or very high. Each of the illustrated cams can be replaced with a cylinder cam or with a pair of complementary cams which define predetermined paths for the respective follower means to thereby further reduce the likelihood of uncontrolled or unpredictable movements of the driven member 9 or 109 during any stage of rotation of the cams.

Another important advantage of the improved apparatus is that it does not employ any timers of the type used in the aforediscussed conventional apparatus. If an apparatus employs timer means, the position of the driven member must be changed from a predetermined starting position during each and every machine cycle. On the other hand, the apparatus of the present invention is designed in such a way that an adjustment of the angular position of the cam 16 or 116 relative to the associated cam 17 or 117 takes place only and alone when the speed of the prime mover 1 or 101 is changed. This entails a minimum of wear upon the parts of the improved apparatus and renders it possible to effect the adjustment of the angular position of the cam 16 or 116 with reference to the cam 17 or 117 within extremely short intervals of time. The result is that the improved apparatus ensures proper actuation of the sealing tool when the number of cycles per unit of time is much higher than the maximum permissible number of cycles in packing or like machines which employ conventional apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for intermittently actuating a heated sealing tool in a machine, such as a cigarette packing machine, wherein the tool is moved into and from heat-transmitting engagement with components of heat-sealable wrapping material, comprising a pair of rotary cams arranged to jointly actuate the tool during a portion of each revolution thereof; drive means for rotating said cams at a variable speed; and regulating means for maintaining the intervals of actuation of the tool at a constant value during each revolution of said cams regardless of changes in rotational speed of said cams, including means for changing the orientation of at least one of said cams with reference to the other of said cams as a function of variations of rotational speed of said cams and while said drive means rotates said cams.

2. The apparatus of claim 1, wherein said cams are rotatable about a common axis and said orientation changing means includes means for changing the angular position of at least one of said cams with reference to the other of said cams.

3. The apparatus of claim 1, wherein said orientation changing means comprises a transmission receiving torque from said drive means and arranged to rotate said one cam.

4. The apparatus of claim 1, wherein said drive means includes means for rotating said cams at the same rotational speed and in the same direction.

5. The apparatus of claim 4, wherein said orientation changing means comprises an adjusting device interposed between said drive means and said one cam and having means for changing the angular position of said one cam with reference to said drive means in response to variations of the speed of said other cam.

6. The apparatus of claim 5, wherein the means for changing the angular position of said one cam relative to said drive means comprises a servomotor providing a kinematic connection between said drive means and said one cam.

7. The apparatus of claim 1, wherein said cams are arranged to rotate about a common axis and further comprising follower means interposed between said cams and the tool.

8. The apparatus of claim 7, wherein said follower means comprises discrete followers for said cams.

9. The apparatus of claim 1, wherein said other cam comprises a shaft which receives torque from said drive means and said one cam is rotatably mounted on said shaft.

10. The apparatus of claim 1, wherein said orientation changing means comprises means for monitoring the speed of said drive means and for generating signals denoting the speed of said drive means, and means for adjusting said one cam relative to said other cam in response to said signals.

11. The apparatus of claim 10, wherein said adjusting means comprises a servomotor and means for regulating said motor in response to said signals.

12. The apparatus of claim 1, wherein said drive means comprises a variable-speed prime mover and a torque-transmitting connection between said prime mover and said other cam.

13. The apparatus of claim 1, wherein said cams are coaxial disc cams having lobes which are arranged to actuate the tool.

14. The apparatus of claim 13, wherein the dimensions of said lobes are identical, as considered in the circumferential direction of the respective cams.

15. Apparatus for intermittently actuating a driven member, particularly a heated sealing tool in a machine, such as a cigarette packing machine, wherein the tool is moved into and from heat-transmitting engagement with components of heat-sealable wrapping material, comprising a pair of rotary cams arranged to jointly actuate the driven member during a portion of each revolution thereof; drive means for rotating said cams at a variable speed; and regulating means for maintaining the intervals of actuation of the driven member at a constant value during each revolution of said cams regardless of changes in rotational speed of said cams, including means for changing the orientation of at least one of said cams with reference to the other of said cams as a function of variations of rotational speed of said cams, said orientation changing means comprising a transmission receiving torque from said drive means and arranged to rotate said one cam, said transmission means comprising a first gear arranged to drive said one cam and a second gear mating with said first gear and being movable about the axis of said first gear, said orientation changing means further comprising means for moving said second gear about the axis of said first gear.

16. Apparatus for intermittently actuating a driven member, particularly a heated sealing tool in a machine, such as a cigarette packing machine, wherein the tool is moved into and from heat-transmitting engagement with components of heat-sealable wrapping material, comprising a pair of rotary cams arranged to jointly actuate the driven member during a portion of each revolution thereof; drive means for rotating said cams at a variable speed; and regulating means for maintaining the intervals of actuation of the driven member at a constant value during each revolution of said cams regardless of changes in rotational speed of said cams, including means for changing the orientation of at least one of said cams with reference to the other of said cams as a function of variations of rotational speed of said cams, said orientation changing means comprising a transmission receiving torque from said drive means and arranged to rotate said one cam, said drive means including means for rotating said other cam in a first direction and said transmission including means for rotating said one cam about the axis of said other cam in a second direction counter to said first direction.

17. Apparatus for intermittently actuating a driven member, particularly a heated sealing tool in a machine, such as a cigarette packing machine, wherein the tool is moved into and from heat-transmitting engagement with components of heat-sealable wrapping material, comprising a pair of cams arranged to rotate about a common axis and to jointly actuate the driven member during a portion of each revolution thereof; drive means for rotating said cams at a variable speed; and regulating means for maintaining the intervals of actuation of the driven member at a constant value during each revolution of said cams regardless of changes in rotational speed of said cams, including means for changing the orientation of at least one of said cams with reference to the other of said cams as a function of variations of rotational speed of said cams, said orientation changing means comprising a transmission receiving torque from said drive means and arranged to rotate said one cam, said transmission means comprising a first bevel gear rotatable about said common axis and receiving torque from said drive means, a second bevel gear rotatable about said common axis and arranged to rotate said one cam, and a third bevel gear mating with said first and second bevel gears, said orientation changing means further comprising means for turning said third bevel gear about said common axis in response to variations of rotational speed of said other cam.

18. The apparatus of claim 17, wherein said third bevel gear has a hub which is turnable about said axis and said turning means comprises means for turning said third bevel gear about said axis through the medium of said hub.

19. Apparatus for intermittently actuating a driven member, particularly a heated sealing tool in a machine, such as a cigarette packing machine, wherein the tool is moved into and from heat-transmitting engagement with components of heat-sealable wrapping material, comprising a pair of rotary cams arranged to jointly actuate the driven member during a portion of each revolution thereof; drive means for rotating said cams at a variable speed; and regulating means for maintaining the intervals of actuation of the driven member at a constant value during each revolution of said cams regardless of changes in rotational speed of said cams, including means for changing the orientation of at least one of said cams with reference to the other of said cams as a function of variations of rotational speed of said cams, said one cam receiving torque from said drive means by way of said other cam.

20. The apparatus of claim 19, wherein said orientation changing means is interposed between said other cam and said one cam.

* * * * *